United States Patent
Iwasawa et al.

(10) Patent No.: US 8,331,040 B2
(45) Date of Patent: Dec. 11, 2012

(54) METHOD OF MANUFACTURING A PHOTOGRAPHIC LENS HAVING MULTIPLE LENS GROUPS TO CORRECT A FOCUS DEVIATION, PHOTOGRAPHIC LENS MANUFACTURED USING THE METHOD, AND PHOTOGRAPHIC APPARATUS INCLUDING THE PHOTOGRAPHIC LENS

(75) Inventors: Yoshito Iwasawa, Suwon-si (KR); Hyun-gyu Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 151 days.

(21) Appl. No.: 12/651,520

(22) Filed: Jan. 4, 2010

(65) Prior Publication Data
US 2010/0232040 A1  Sep. 16, 2010

(30) Foreign Application Priority Data
Mar. 13, 2009  (KR) .................. 10-2009-0021850

(51) Int. Cl.
G02B 13/04 (2006.01)
G02B 15/14 (2006.01)

(52) U.S. Cl. ....................... 359/753; 359/684

(58) Field of Classification Search ............. 359/680, 359/682, 749, 753
See application file for complete search history.

(56) References Cited

U.S. PATENT DOCUMENTS

| 7,345,832 B2 * | 3/2008 | Shibuya et al. | 359/811 |
| 7,446,956 B2 * | 11/2008 | Shimada | 359/784 |
| 7,933,079 B2 * | 4/2011 | Ning et al. | 359/811 |

* cited by examiner

Primary Examiner — David N Spector
(74) Attorney, Agent, or Firm — Drinker Biddle & Reath LLP

(57) ABSTRACT

A photographic lens of a photographic apparatus which includes a plurality of lens groups may be manufactured using a method which includes correcting a focus deviation from a designed value generated in one lens group by adjusting a distance between lenses of another lens group. The distance between lenses may be adjusted using a washer. The lenses between which the distance is adjusted may include a positive lens and a negative lens, and the lens group having the lenses between which the distance is adjusted may have a negative refractive power.

18 Claims, 4 Drawing Sheets

METHOD OF MANUFACTURING A PHOTOGRAPHIC LENS HAVING MULTIPLE LENS GROUPS TO CORRECT A FOCUS DEVIATION, PHOTOGRAPHIC LENS MANUFACTURED USING THE METHOD, AND PHOTOGRAPHIC APPARATUS INCLUDING THE PHOTOGRAPHIC LENS

CROSS-REFERENCE TO RELATED PATENT APPLICATION

This application claims the priority benefit of Korean Patent Application No. 10-2009-0021850, filed on Mar. 13, 2009, in the Korean Intellectual Property Office, the disclosure of which is incorporated herein in its entirety by reference.

BACKGROUND

1. Field of the Invention

The present invention generally relates to a photographic lens, a method of manufacturing the photographic lens, and a photographic apparatus including the photographic lens. More particularly, the present invention relates to a method of manufacturing a photographic lens by which high optical performance may be secured by reducing errors caused while assembling lenses.

2. Description of the Related Art

Recently, imaging optical instruments such as digital cameras or digital camcorders using image pickup devices, such as charge coupled devices (CCD) or complementary metal-oxide semiconductors (CMOS), have been widely used. As more imaging optical instruments having improved performance (such as increases in magnification and increases in the number of pixels) become lower-priced and more lightweight, zoom lenses used in imaging optical instruments need to also have improved performance, and become lower-priced and more lightweight.

For this, a three group type zoom lens including three lens groups, respectively having negative, positive, and positive refractive power, that are sequentially arranged from an object side, has been widely used to reduce the number of lenses constituting a zoom lens and reduce an entire optical length.

However, as the magnification of an optical system increases and the size of the optical system decreases, aberrations caused by manufacturing errors or assembly errors, i.e., sensitivity to the errors, tends to increase. In addition, aberrations caused by manufacturing errors or assembly errors need to be reduced in order to obtain an optical system having excellent imaging performance with an increased number of pixels.

Thus, there is a need to prevent lens manufacturing errors and assembly errors. However, there is a limit to manufacturing and assembly error reduction. More specifically, having too small of an error margin may decrease the yield.

A method of adjusting lenses includes modifying the structure of a lens barrel or a lens housing. However, the configuration of the lens housing may become complicated when lenses are highly sensitive to spherical aberration and field curvature.

SUMMARY

An exemplary method of manufacturing a photographic lens by which high optical performance is secured by reducing errors caused while assembling lenses, a photographic lens manufactured using the method, and a photographic apparatus including the photographic lens are described.

An exemplary method of manufacturing a photographic lens includes assembling a first lens group including a negative lens and a positive lens such that the first lens group has a negative refractive power, assembling a second lens group having a positive refractive power, arranging the first lens group and the second lens group sequentially from an object side, and correcting a focus deviation from a designed value by adjusting a distance between the negative lens and the positive lens of the first lens group.

The focus deviation may be generated in one or more lens groups other than the first lens group.

The distance adjusted may include a distance from an image surface of the negative lens.

The photographic lens may include three lens groups sequentially arranged from an object side and respectively having negative, positive, and positive refractive power.

A distance adjusting washer may be used to adjust the distance between the negative lens and the positive lens.

The method may also include preparing a plurality of distance adjusting washers having different thicknesses, selecting a washer capable of correcting a measured focus deviation from among the plurality of distance adjusting washers, attaching the selected washer to a barrel, and assembling the negative lens and the positive lens into the barrel. The method may also include measuring the focus deviation. The measuring of the focus deviation may include sub-assembling one or more lens groups of the photographic lens other than the first lens group, and measuring a focus of the sub-assembled one or more lens groups. The method may also include determining the thickness for the washer to be capable of correcting the measured focus deviation.

An exemplary photographic lens may include a first lens group including a negative lens and a positive lens, the first lens group having negative refractive power, and a second lens group having positive refractive power, wherein the first lens group and the second lens group are sequentially arranged from an object side, and wherein a distance adjusting unit is disposed between the negative lens and the positive lens of the first lens group. The distance adjusting unit may include a washer. The photographic lens may also include a third lens group having positive refractive power, wherein the first lens group, the second lens group, and the third lens group are sequentially arranged from the object side. The third lens group may adjust a focus of the photographic lens. The negative lens and the positive lens of the first lens group and the distance adjusting unit may be assembled into a barrel. The second lens group may include a doublet lens to control chromatic aberration.

An exemplary photographic apparatus may include the photographic lens, and an image pickup device which forms an image of a subject from light incident through the photographic lens.

BRIEF DESCRIPTION OF THE DRAWINGS

The above and other features and advantages of the present invention will become more apparent by describing in detail exemplary embodiments thereof with reference to the attached drawings listed below.

DETAILED DESCRIPTION

Figure 1:
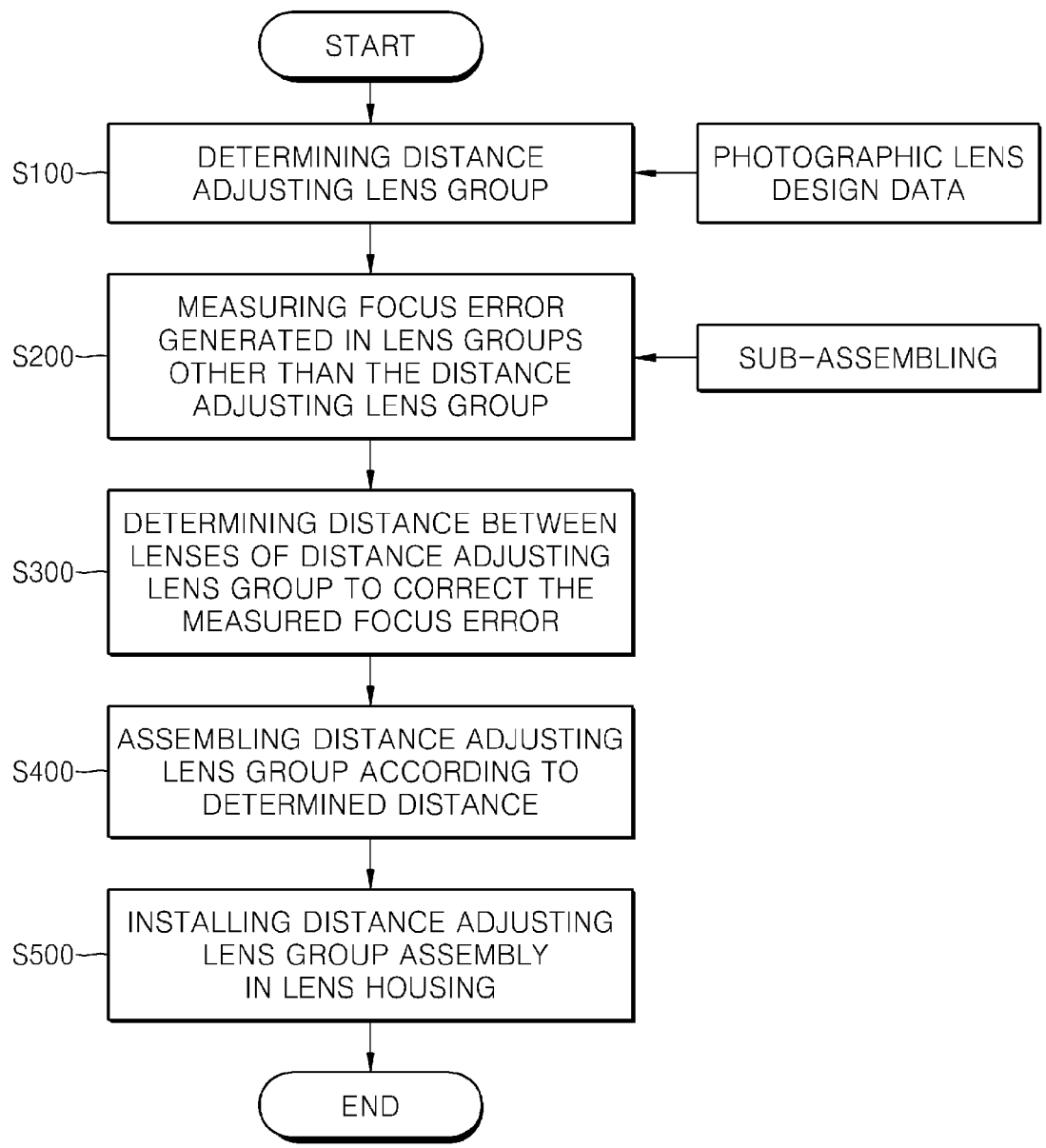
FIG. 1 is a flowchart depicting an exemplary method of manufacturing a photographic lens.

Hereinafter, embodiments of the present invention will now be described more fully with reference to the accompanying drawings. It will be appreciated that in the drawings, the size of elements may be exaggerated for clarity, and like reference numerals in the drawings denote like elements.

FIG. 1 is a flowchart depicting an exemplary method of manufacturing a photographic lens. The method may be used to manufacture a photographic lens including a plurality of lens groups. A focus deviation from a designed value generated in one lens group from among the plurality of lens groups may be corrected by adjusting a distance between lenses in another lens group. The method will be described in more detail. First, a distance adjusting lens group may be selected from the plurality of lens groups constituting the photographic lens (S100). For example, from among the plurality of lens groups constituting the photographic lens, a lens group which compensates for a focus deviation by adjusting a distance between lenses may be selected. The distance adjusting lens group may be selected using photographic lens design data, or by considering sensitivity to the focus deviation from the designed value or focus adjustment effects by adjusting the distance. The photographic lens may include two lens groups respectively having negative and positive refractive power and sequentially arranged from an object side. The photographic lens may instead include three lens groups respectively having negative, positive, and positive refractive power and sequentially arranged from an object side. In this regard, a first lens group from the object side may be selected as the distance adjusting lens group.

Next, a focus of the other lens groups not including the distance adjusting lens group may be measured to measure the focus deviation (S200). In this regard, the other lens groups may be respectively sub-assembled into a barrel and installed in a lens housing, and then the focus may be measured using a device such as a collimator.

Then, a distance between lenses of the distance adjusting lens group may be determined such that measured focus deviation may be corrected (S300). The distance adjusting lens group may then be assembled to be positioned at the determined distance to correct the measured focus deviation (S400). For this, a database of distances between lenses to correct various focus deviations may be prepared. In addition, when the distance adjusting lens group is assembled to be positioned at the determined distance, a distance adjusting washer may be used as a distance adjusting unit. In this regard, distance adjusting washers having various thicknesses may be used according to the prepared database. Thereafter, the distance adjusting lens group assembly may be installed in a lens housing (S500).

Hereinafter, the method of manufacturing a photographic lens will be described in more detail with reference to a three lens group type photographic lens.

Figure 2:
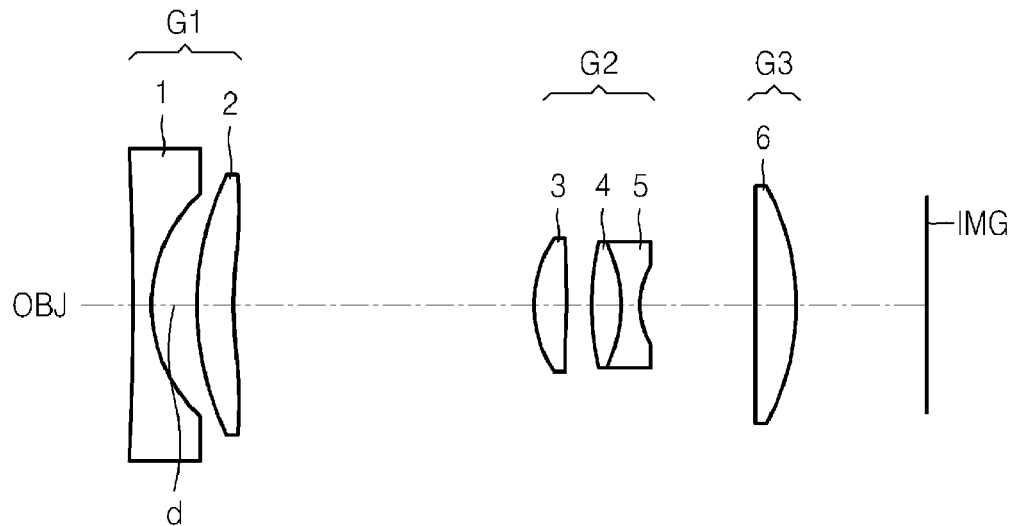
FIG. 2 illustrates an exemplary optical arrangement of a three lens group type photographic lens manufactured using an exemplary method.

FIG. 2 illustrates an exemplary optical arrangement of a three lens group type photographic lens manufactured using an exemplary method. A photographic lens may include a first lens group G1, a second lens group G2, and a third lens group G3 that are sequentially arranged from an object side OBJ to an image surface IMG. The lens groups G1, G2, and G3 may respectively have negative, positive, and positive refractive power. The first lens group G1 may include two lenses, for example, a first lens 1 having negative refractive power and a second lens 2 having positive refractive power. The second lens group G2 may adjust magnification and include three lenses. The second lens group G2 may include a third lens 3 having positive refractive power, a fourth lens 4 having positive refractive power, and a fifth lens having negative refractive power. The fourth lens 4 and the fifth lens 5 may constitute a doublet lens to control chromatic aberration. The third lens group G3 may adjust focusing and may include a sixth lens having positive refractive power. The third lens group G3 may include a singlet lens to minimize the size of the photographic lens. An image pickup device which forms an image of a subject from light incident through the photographic lens from the object side may be disposed at the image surface IMG.

The photographic lens including three lens groups illustrated in FIG. 2 may have great aberration sensitivity due to manufacturing errors or assembly errors since the photographic lens may be manufactured to have improved optical performance and a minimized size. Furthermore, there may be great aberration in the first lens group G1 and the second lens group G2. Conventionally, a distance between the first lens group G1 and the second lens group G2 is adjusted to correct for focus deviation. However, the focus deviation may not be completely corrected due to largely remaining spherical aberration and field curvature. Thus, in a highly sensitive optical system, aberrations need to be corrected not only by adjusting a distance between lens groups but also by adjusting a distance between lenses within a lens group. For this, the first lens group G1 may be selected as a distance adjusting lens group, and a distance d between the first lens 1 and the second lens 2 may be adjusted. Aberrations of the photographic lens caused by manufacturing errors or assembly errors, e.g., a lens focus deviation, spherical aberration, and field curvature, may be corrected by adjusting the distance from the image surface of the first lens 1, as a negative lens, when the distance d is adjusted. Further, since an aberration sensitivity to the focus error of the negative lens 1 of the first lens group regarding spherical aberration or field curvature may be similar to the aberration sensitivity of an optical element constituting the second lens group G2, spherical aberration or field curvature may be reduced by combining the first lens group G1 and the second lens group G2 such that the focus error is reduced.

Figure 3:
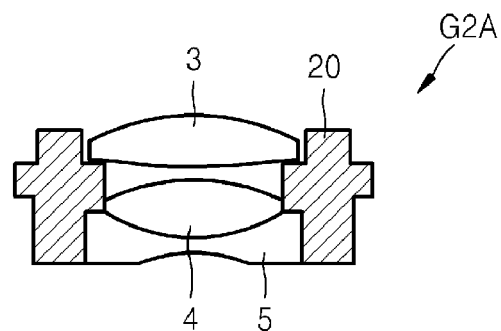
FIG. 3 illustrates an exemplary second lens group assembly prepared by assembling a second lens group of the three lens group type photographic lens of FIG. 2 into a second group barrel.
Figure 4:
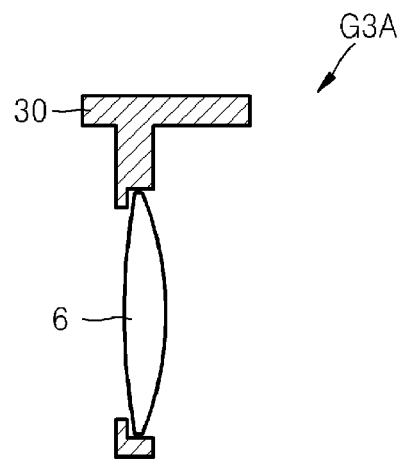
FIG. 4 illustrates an exemplary third lens group assembly prepared by assembling a third lens group of the three lens group type photographic lens of FIG. 2 into a third group barrel.

FIGS. 3 and 4 illustrate an exemplary sub-assembling process to measure focus. FIG. 3 illustrates an exemplary second lens group assembly G2A prepared by assembling the second lens group G2 of FIG. 2 into a second group barrel 20, and FIG. 4 illustrates an exemplary third lens group assembly G3A prepared by assembling the third lens group G3 of FIG. 2 into a third group barrel 30.

Figure 5:
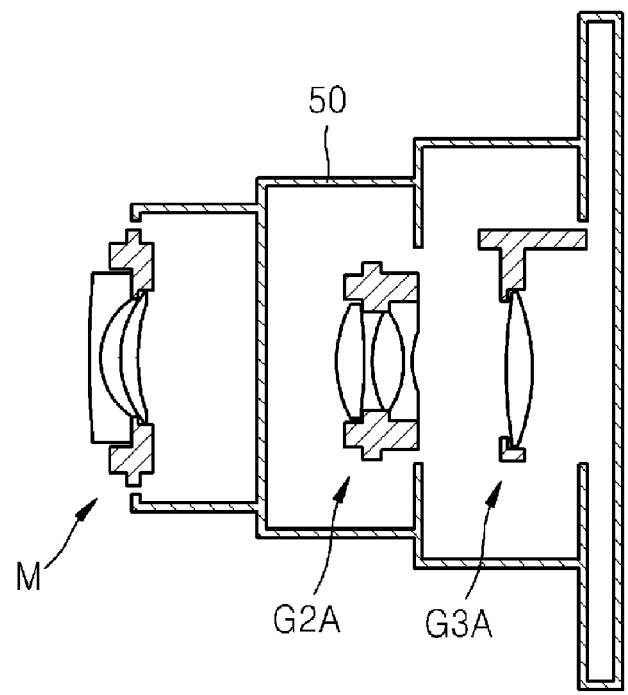
FIG. 5 illustrates an exemplary lens assembly prepared by assembling a master first lens group, a second lens group assembly, and a third lens group assembly into a lens housing to measure focus.

FIG. 5 illustrates an exemplary lens assembly prepared by assembling a master first lens group M, the second lens group assembly G2A, and the third lens group assembly G3A into a lens housing to measure focus. The second lens group assembly G2A and the third lens group assembly G3A may be installed in the lens housing, and the master first lens group M may be installed in a position in which the first lens group G1, as the distance adjusting lens group, is to be installed. The master first lens group G1 may be assembled such that lenses are arranged at a predetermined distance from each other so as not to have a focus deviation from a desired value to provide a reference for the distance adjustment to correct the focus deviation when the first lens group G1 is assembled. In the assembled lens housing, the focus of the lens system may be measured, and then the distance between the lenses in the first lens group G1 may be determined as, for example, d1, to correct the measured focus error.

Figure 6A:
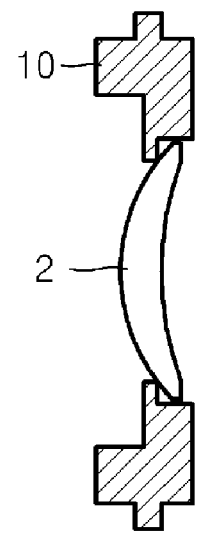
FIGS. 6A to 6C illustrate an exemplary process of sub-assembling a first lens group of the three lens group type photographic lens of FIG. 2 into a first group barrel according to a measured focus.
Figure 6B:
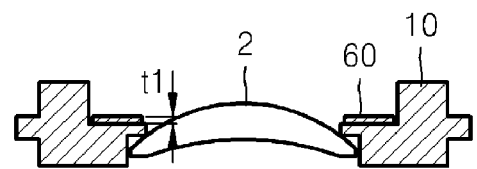
Figure 6C:
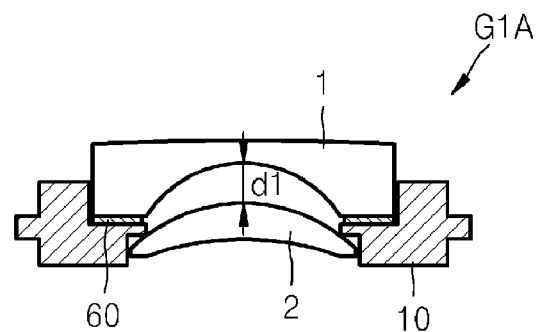

FIGS. 6A to 6C illustrate an exemplary process of sub-assembling the first lens group G1 into a first group barrel 10 according to the measured focus. First, as shown in FIG. 6A, the second lens 2 may be assembled into the first group barrel 10. Then, as shown in FIG. 6B, a washer 60 having a thickness of t1, as a distance adjusting unit, may be attached to a position on the first group barrel 10 in which the first lens 1 is to be disposed. In this regard, the washer 60 having a thickness of t1 may be used to form the predetermined distance d1 between the first lens 1 and the second lens 2. Washers having various thicknesses within an appropriate range may be prepared in order to correct various ranges of focus deviations. In order to correct a focus deviation in the photographic lens having three lens groups drawn in FIGS. 6A to 6C, five washers having thicknesses of 20, 40, 60, 80, and 100 µm, respectively, may be used to adjust the distance between lenses of the first lens group G1. However, the thicknesses of the washers may vary according to the configuration of the photographic lens. Then, as shown in FIG. 6C, the first lens 1 may be attached to the washer 60 to manufacture the first lens group assembly G1A.

Figure 7:
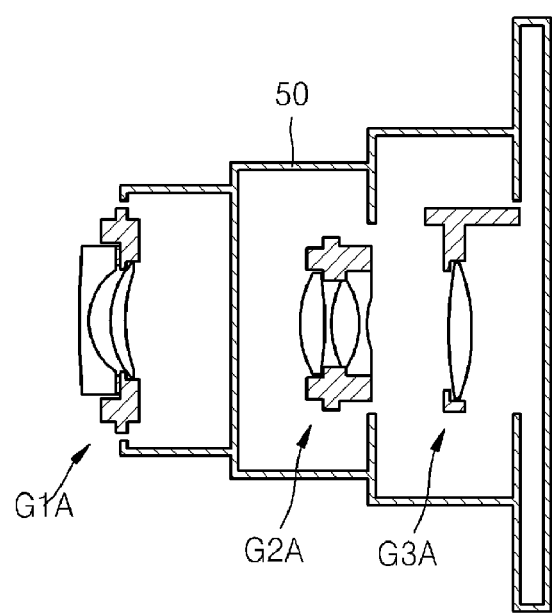
FIG. 7 illustrates an exemplary photographic lens assembled into a lens housing.

FIG. 7 illustrates an exemplary photographic lens assembled into a lens housing. In the lens housing, the first lens group assembly G1A and the second lens group assembly G2A may be assembled in such a way that focus deviation is minimized. In the lens housing structure, not only may the focus deviation be minimized, but field curvature or spherical aberration may also be minimized.

According to embodiments of the method of manufacturing the photographic lens according to the present invention, manufacturing or assembly errors of the photographic lens may be corrected while being assembled, and thus various aberrations remaining after assembling may be reduced. Thus, the photographic lens and the photographic apparatus may have improved performance and greater miniaturization.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. A method of manufacturing a photographic lens, the method comprising:
   assembling a first lens group including a negative lens and a positive lens, the first lens group having a negative refractive power;
   assembling a second lens group having a positive refractive power;
   arranging the first lens group and the second lens group sequentially from an object side;
   selecting a thickness of a spacer for the photographic lens to correct for a focus deviation of the photographic lens measured after a first of the assemblings; and
   inserting the spacer between the negative lens and the positive lens of the first lens group to substantially correct the measured focus deviation.

2. The method of claim 1, wherein the focus deviation is generated in one or more lens groups other than the first lens group.

3. The method of claim 1, wherein the thickness includes a distance from an image surface of the negative lens.

4. The method of claim 1, wherein the photographic lens comprises three lens groups sequentially arranged from the object side and respectively having negative, positive, and positive refractive powers.

5. The method of claim 1, further comprising measuring the focus deviation by:
   sub-assembling one or more lens groups of the photographic lens other than the first lens group; and
   measuring a focus of the sub-assembled one or more lens groups.

6. The method of claim 1, wherein inserting the spacer adjusts a distance between the negative lens and the positive lens.

7. The method of claim 6, further comprising:
   preparing a plurality of spacers having different thicknesses;
   selecting the spacer from among the plurality of spacers;
   attaching the selected spacer to a barrel; and
   assembling the negative lens and the positive lens into the barrel.

8. A photographic lens comprising a first lens group including a negative lens, a positive lens, a barrel to hold the negative lens and the positive lens, and a distance adjusting unit disposed between the negative lens and the positive lens, the first lens group a having negative refractive power; and a second lens group having a positive refractive power, the first lens group and the second lens group being sequentially arranged from an object side, the photographic lens prepared by a process comprising:
   assembling at least a portion of the photographic lens without the distance adjusting unit to form a photographic lens assembly;
   measuring a value representing at least one of a focus deviation, a spherical aberration or a field curvature of the photographic lens assembly;
   selecting a thickness of the distance adjusting unit based on the measured value; and
   inserting the distance adjusting unit between the negative lens and the positive lens of the first lens group in the photographic lens assembly to substantially correct the measured at least one of the focus deviation, the spherical aberration or the field curvature.

9. The photographic lens of claim 8, wherein the distance adjusting unit includes a washer.

10. The photographic lens of claim 8, further comprising a third lens group having a positive refractive power, wherein the first lens group, the second lens group, and the third lens group are sequentially arranged from the object side.

11. The photographic lens of claim 10, wherein the third lens group adjusts a focus of the photographic lens.

12. The photographic lens of claim 8, further comprising assembling the negative lens, the positive lens of the first lens group, and the distance adjusting unit into the barrel.

13. The photographic lens of claim 8, wherein the second lens group includes a doublet lens to control chromatic aberration.

14. A photographic apparatus comprising a photographic lens including a first lens group comprising a negative lens and a positive lens, the first lens group having a negative refractive powers; a second lens group having a positive refractive power, the first lens group and the second lens group being sequentially arranged from an object sides; a distance adjusting unit disposed between the negative lens and the positive lens of the first lens group; and, an image pickup device that forms an image of a subject from light incident through the photographic lens, the photographic apparatus prepared by a process comprising:

assembling at least a portion of the photographic lens without the distance adjusting unit to form a photographic lens assembly;

measuring a value representing at least one of a focus deviation, a spherical aberration or a field curvature of the photographic lens assembly;

selecting a thickness of the distance adjusting unit based on the measured value; and inserting the distance adjusting unit between the negative lens and the positive lens of the first lens group in the photographic lens assembly to substantially correct the measured at least one of the focus deviation, the spherical aberration or the field curvature.

15. The photographic apparatus of claim 14, wherein the distance adjusting unit includes a washer.

16. The photographic apparatus of claim 14, wherein the photographic lens further comprises a third lens group having positive refractive power, wherein the first lens group, the second lens group, and the third lens group are sequentially arranged from the object side.

17. The photographic apparatus of claim 14, further comprising assembling the negative lens, the positive lens of the first lens group, and the distance adjusting unit into a barrel.

18. The photographic apparatus of claim 14, wherein the second lens group includes a doublet lens to control chromatic aberration.

* * * * *

UNITED STATES PATENT AND TRADEMARK OFFICE
CERTIFICATE OF CORRECTION

PATENT NO. : 8,331,040 B2
APPLICATION NO. : 12/651520
DATED : December 11, 2012
INVENTOR(S) : Yoshito Iwasawa and Hyun-gyu Park It is certified that error appears in the above-identified patent and that said Letters Patent is hereby corrected as shown below:

IN THE CLAIMS:

In Claim 14, Column 7, lines 13-14, replace "a negative refractive powers" with -- a negative refractive power --

In Claim 14, Column 7, line 16, replace "an object sides" with -- an object side --

Signed and Sealed this
Sixteenth Day of July, 2013

Teresa Stanek Rea
*Acting Director of the United States Patent and Trademark Office*